United States Patent Office 3,798,246
Patented Mar. 19, 1974

3,798,246
PROCESS FOR PREPARING SOYBEAN PHOSPHATIDES
Hideo Shimazaki, Nobuhiro Mitsuura, and Shuji Tsukamoto, Kanagawa, Japan, assignors to Ajinomoto Co., Inc., Tokyo, Japan
No Drawing. Filed Mar. 10, 1972, Ser. No. 233,746
Int. Cl. C07f 9/02; A23j 7/00
U.S. Cl. 260—403
8 Claims

ABSTRACT OF THE DISCLOSURE

Crude phosphatides recovered from soybean oil in a conventional manner are purified of undesirable color and odor by contacting a solution thereof in n-hexane with activated silica gel for at least 20 minutes, separating the silica gel from the solution, and evaporating the solvent. The purified material has a lighter color, more pleasing odor and flavor, and reduced acid and peroxide values. The silica gel may be returned to the process after washing in lower alkanols.

---

This invention relates to a process for preparing soybean phosphatides. More particularly, this invention relates to a process for purifying crude soybean phosphatides to remove undesirable color and odor.

Hitherto, soybean phosphatides have been separated from non-degummed soybean oil coming from the stripping columns in the extraction process. The separation of soybean phosphatides has been carried out by introducing into the crude oil hot water or steam or by adding acetic acid anhydride to precipitate the phosphatides. The precipitated phosphatides contain glycerides, and have an undesirable color and odor.

In one of the known methods of purification to remove the color and odor the precipitated phosphatides are dried by distillation under vacuum at about 60° C. until they are free of undesirable odor and flavor. To produce a lighter-colored product, the phosphatides are treated with various bleaching agents. The known bleaching agents that can be used are hydrogen peroxide, various organic peroxides, ammonium persulfate, etc. Lighter-colored phosphatides can be also obtained by subjecting miscella to the action of bleaching agents such as activated clay or alumina (U.S. Pat. No. 2,461,750).

The soybean phosphatides thus obtained contain roughly two-thirds acetone-insoluble matter or phosphatides and one-third soybean oil and other substances.

A more highly purified form is manufactured by extracting the phosphatides with acetone to remove the glyceride oils, fatty acids, sterol, traces of bitter material, etc.

However, the purified soybean phosphatides obtained by the known method are still of insufficient purity, especially in color and flavor. This is the reason why such material has found little application in many potential uses, although large quantities of soybean phosphatides are easily and economically manufactured as described above.

It is therefore an object of the present invention to provide an industrially applicable process to produce soybean phosphatides which do not have undesirable odor or flavor and color.

We have now found that crude soybean phosphatides can be bleached and deodorized by subjecting the n-hexane solution of the crude soybean phosphatides to the action of an activated silica-gel.

Any kind of soybean phosphatides obtained by the known method can be purified by the process of the present invention. The soybean phosphatides are dissolved in n-hexane in a concentration not higher than 50% by weight.

To the solution, an activated silica-gel is added. The solution is permitted to stand with moderate agitation at a temperature not higher than 55° C. and preferably at 15 to 40° C. and is subjected to the action of the activated silica-gel for at least 20 minutes.

The amounts of the activated silica-gel to be added to the solution is preferably 0.5 to 3 times the weight of the crude phosphatides.

The activation condition of the silica-gel is not critical, and preferably silica-gel is heated and activated for more than 30 minutes at a temperature higher than 80° C.

After removing silica-gel by filtration and n-hexane by evaporation, purified soybean phosphatides are recovered as a residue on evaporation.

Silica-gel on which impurities are adsorbed is washed by lower alkanol such as ethanol and is used again for purification of the crude phosphatides after activation.

The soybean phosphatides thus obtained are greatly improved in their color and odor, and contain smaller amounts of glycerides. The acid value and peroxide value are also reduced by the purification of the present invention.

Because of the improved quality, the purified soybean phosphatides can be used for foodstuffs, for emulsifier in cosmetics or for therapeutic use. Especially, the purified soybean phosphatides can be employed to protect the mucous membrane of the human throat and keep the throat fresh.

EXAMPLE 1

Two hundred grams of crude soybean phosphatides whose acid value and peroxide value were 22.9 and 43.4 respectively and which contained 59.1% acetone insoluble matter, were dissolved in n-hexane. The weight of n-hexane used was 3 times the total weight of activated silica-gel and crude phosphatides.

The amounts of silica-gel which was previously activated for 1 hour at 90° C., listed in Table 1 were added to the solution and the solution was stirred for 30 minutes at room temperature. Thereafter silica-gel was removed by filtration and n-hexane by evaporation under vacuum.

Residue on distillation and acetone insoluble matter in the residue are shown in Table 1.

TABLE 1

| | Residue on distillation (recovery percent) | Acetone insoluble (percent) |
|---|---|---|
| The amount of silica-gel used (g.): | | |
| 0 | 100 | 59.1 |
| 100 | 91 | 68.2 |
| 200 | | 72.1 |
| 240 | 77 | 77.1 |
| 260 | 72 | 83.0 |
| 300 | 68 | 88.0 |
| 340 | 65 | 91.3 |
| 400 | 58 | 97.7 |
| 600 | 54 | 97.9 |

EXAMPLE 2

Two hundred grams of crude soybean phosphatides (acetone insoluble 65.5%, acid value 22.9, peroxide value 43.4) and 200 g. or 100 g. of activated silica-gel were placed in 500 g. of n-hexane. The solutions were stirred for one hour at room temperature. Thereafter, silica-gel and n-hexane were removed, and purified soybean phosphatides were obtained. Acetone insoluble (percent), acid value and peroxide value of purified phosphatides are shown in Table 2.

The filtered silica-gel was washed twice with ethyl alcohol and the washings were collected. After evaporating ethyl-alcohol, the oils as shown in Table 2 were obtained as residue.

TABLE 2

| | Purified phosphatides | | | | Materials adsorbed on silica-gel | | | |
| --- | --- | --- | --- | --- | --- | --- | --- | --- |
| | Percent | | | | Percent | | | |
| | Recovery | Acetone insoluble | Acid value | Peroxide value | Recovery | Acetone insoluble | Acid value | Peroxide value |
| Silica-gel used (g.): | | | | | | | | |
| 200 | 77.1 | 83.9 | 22.4 | 13.9 | 21.0 | 3.8 | 21.1 | 10.6 |
| 100 | 88.0 | 74.5 | 21.1 | 15.7 | 10.6 | 5.0 | 33.6 | 16.0 |

EXAMPLE 3

Efficiency of purification by activated silica-gel were compared with that by activated alumina as follows:

Two hundred grams of the crude soybean phosphatides of Example 1 and 100 g. of the activated silica-gel in Example 1 or of alumina activated at 120° C. for 1 hour were placed into 500 g. of n-hexane. The solutions were allowed to stand for 1 hour with agitation.

The two purified phosphatides thus obtained were compared by 30 persons. Among them 28 persons reported that the flavor of the phosphatides purified by the activated silica-gel was more improved than that of the phosphatides purified by the activated alumina, and the former was preferred to the latter.

One hundred grams of vinegar, 100 g. of salad oil, 4 g. of salt, 0.2 g. of monosodium glutamate and 0.05 g. of the phosphatides purified by the activated silica-gel or the phosphatides purified by the activated alumina were mixed to make two salad dressings. The two salad dressings were compared by 30 persons, and 25 people out of 30 preferred the salad dressing containing phosphatides purified with silica gel. The others answered that there was no difference.

What is claimed is:

1. In a process of preparing soybean phosphatides in which crude, colored phosphatides containing soybean oil are separated from soybeans, and the crude phosphatides are purified of acetone soluble components including colorizing matter and said oil, the improvement in the purification which comprises:
    (a) dissolving said crude phosphatides in n-hexane;
    (b) contacting the solution so obtained with a sufficient amount of silica gel until a major portion of said components is adsorbed from the solution on said silica gel; and
    (c) separating the silica gel having said components adsorbed thereon and said n-hexane from the purified phosphatides.

2. In a process as set forth in claim 1, said amount of silica gel and the period of contacting said solution with said silica gel being sufficient to reduce the amount of acetone-soluble components in said purified phosphatides to less than 20 percent.

3. In a process as set forth in claim 1, said amount of silica gel and the period of contacting said solution with said silica gel being sufficient to substantially completely remove said acetone-soluble components from the purified phosphatides.

4. A process as set forth in claim 1, said amount of silica gel and the period of contacting said solution with said silica gel being sufficient to reduce the amount of acetone-soluble components in said purified phosphatides to substantially less than ten percent.

5. In a process as set forth in claim 1, the crude phosphatides being dissolved in an amount of said n-hexane sufficient to make the phosphatide concentration in said solution not greater than 50% by weight.

6. In a process as set forth in claim 5, the temperature of said solution during said contacting being not higher than 55° C.

7. In a process as set forth in claim 6, said temperature being between 15° and 40° C.

8. In a process as set forth in claim 6, said amount of silica gel being between 0.5 and 3 times the weight of said crude phosphatides, and said solution being contacted with said silica gel for at least 20 minutes.

References Cited

UNITED STATES PATENTS

| 2,461,751 | 2/1949 | Mormor et al. | 260—403 |
| 3,694,473 | 9/1972 | Eibl et al. | 260—403 |

ELBERT L. ROBERTS, Primary Examiner

UNITED STATES PATENT OFFICE
CERTIFICATE OF CORRECTION

Patent No. 3,798,246   Dated March 19, 1974

Inventor(s) HIDEO SHIMAZAKI ET AL

It is certified that error appears in the above-identified patent and that said Letters Patent are hereby corrected as shown below:

In the heading, after the fourth line after the title, insert --

Claims priority, application Japan, March 13, 1971, 13796/1971 --

Signed and sealed this 15th day of October 1974.

(SEAL)
Attest:

McCOY M. GIBSON JR.
Attesting Officer

C. MARSHALL DANN
Commissioner of Patents